(12) United States Patent
Theiss et al.

(10) Patent No.: US 7,269,533 B2
(45) Date of Patent: Sep. 11, 2007

(54) METHOD FOR THE DETERMINATION OF PARAMETERS OF A SEAT PASSENGER

(75) Inventors: Christian Theiss, Sankt Vith Recht (BE); Marc Schifflers, Lontzen (BE); Patrick Di Mario Cola, Fontoy (FR)

(73) Assignee: IEE International Electronics & Engineering S.A., Echternach (LU)

( * ) Notice: Subject to any disclaimer, the term of this patent is extended or adjusted under 35 U.S.C. 154(b) by 166 days.

(21) Appl. No.: 10/489,028

(22) PCT Filed: Aug. 28, 2002

(86) PCT No.: PCT/EP02/09586

§ 371 (c)(1),
(2), (4) Date: Aug. 18, 2004

(87) PCT Pub. No.: WO03/023335

PCT Pub. Date: Mar. 20, 2003

(65) Prior Publication Data

US 2005/0001411 A1 Jan. 6, 2005

(30) Foreign Application Priority Data

Sep. 6, 2001 (LU) .................................. 90825

(51) Int. Cl.
*G06F 17/18* (2006.01)
(52) U.S. Cl. .................................. 702/181; 701/45
(58) Field of Classification Search .................. 702/91, 702/93, 94, 98, 101, 104, 105, 116, 138, 141, 702/142, 146, 173, 181, 182, 189, 193, 199; 701/45; 280/732, 735
See application file for complete search history.

(56) References Cited

U.S. PATENT DOCUMENTS

| | | | | |
|---|---|---|---|---|
| 5,232,243 A | * | 8/1993 | Blackburn et al. | 280/732 |
| 5,474,327 A | * | 12/1995 | Schousek | 280/735 |
| 5,482,314 A | | 1/1996 | Corrado et al. | |
| 5,528,698 A | | 6/1996 | Kamei et al. | |
| 5,626,359 A | * | 5/1997 | Steffens et al. | 280/735 |

(Continued)

FOREIGN PATENT DOCUMENTS

EP 0 971 242 A1 1/2000

(Continued)

OTHER PUBLICATIONS

K. Billen, L. Federspiel, P. Schockmel, B. Serban, Occupant Classification System for Smart Restraint Systems, 1999, Society of Automotive Engineers, Inc., pp. 33-38.

*Primary Examiner*—Carol S. W. Tsai
*Assistant Examiner*—Mohamed Charioui
(74) *Attorney, Agent, or Firm*—McCormick, Paulding & Huber LLP

(57) ABSTRACT

A method for the determination of a physical property parameter of a seat passenger includes getting a reading of at least two parameters from an occupancy sensor; plotting a probability vector which shows, for each value of the physical property, the probability to cause the readings of the at least two parameters; and correlating the physical property parameter to the range of values of the probability vector with the highest probabilities.

18 Claims, 3 Drawing Sheets

U.S. PATENT DOCUMENTS

| | | |
|---|---|---|
| 5,890,085 A | 3/1999 | Corrado et al. |
| 6,012,007 A | 1/2000 | Fortune et al. |
| 6,252,240 B1 * | 6/2001 | Gillis et al. ............ 250/559.38 |
| 6,272,411 B1 | 8/2001 | Corrado et al. |
| 6,609,054 B2 * | 8/2003 | Wallace ....................... 701/45 |
| 6,845,339 B2 * | 1/2005 | Winkler et al. ............. 702/173 |

FOREIGN PATENT DOCUMENTS

| | | |
|---|---|---|
| WO | WO99/38731 | 1/1999 |
| WO | WO 01/18506 A1 | 8/2000 |
| WO | WO 01/85497 A1 | 5/2001 |

* cited by examiner

METHOD FOR THE DETERMINATION OF PARAMETERS OF A SEAT PASSENGER

CROSS REFERENCE TO RELATED APPLICATIONS

This application is entitled to the benefit of and incorporates by reference in their entireties essential subject matter disclosed in International Application No. PCT/EP02/09586 filed on Aug. 28, 2002 and Luxembourg Patent Application No. 90825 filed on Sep. 6, 2001.

FIELD OF THE INVENTION

The present invention relates to a method for the determination of several parameters relating to an occupancy status of a vehicle seat, such as the weight and/or the stature or build of a passenger sitting in the vehicle seat.

BACKGROUND OF THE INVENTION

In order to protect the lives of passengers during a traffic accident, modern vehicles are generally fitted with a protection system comprising several airbags and seat belt pretensioners, which are used to absorb the energy of a passenger released during the collision due to the accident. It is clear that such systems are most effective when they are well adapted to the specific requirements of each passenger, i.e. to the weight and/or the size of the passenger. That is why microprocessor-controlled protection systems have been designed which provide several operational modes, for example allowing an adaptation of the instant at which airbags are deployed and their volume, of the instant at which safety belts are released after the collision, etc., as a function of the build of the passenger and the position of the passenger on the seat.

In order to enable the control microprocessor to select the optimum operational mode for a given passenger, it is therefore necessary to have available a method and a device for detecting the build or bodily form of the passenger which determines the size and/or the weight and/or the position of the passenger and which indicates this to the control circuit of the protection system.

For this purpose, the patent U.S. Pat. No. 5,232,243 describes a device for detecting the weight of a passenger which comprises several individual force sensors arranged in a matrix array in the vehicle seat cushion. The force sensors have an electric resistance that varies with the applied force and are known by the abbreviation FSR (force sensing resistor). The resistance of each sensor is measured individually and, by adding the forces corresponding to the values of these resistances, an indication is obtained of the total force exerted, i.e. of the weight of the passenger. In other words, the method used in U.S. Pat. No. 5,232,243 consists of directly associating a specific weight to a specific reading of the sensor.

However, the total weight of a passenger does not act solely on the surface of the seat, since part of the weight is supported by the passenger's legs, which rest on the bottom of the vehicle, and another part rests on the back of the seat. In addition, the ratios between the various parts vary considerably with the passenger's position on the seat, which causes the total force measured by the individual force sensors not to correspond to the real weight of the passenger but to experience very large variations depending on the passenger's posture on the seat. This means on the other hand, that the same reading of the sensor, i.e. the same distribution of individually measured forces in the case of a sensor comprising individual force sensors, can be caused by the presence of passengers having rather different physical properties. Hence there is a risk of wrong classification of a specific passenger, which will cause the restraint system to be deployed in a non-adapted mode.

SUMMARY OF THE INVENTION

The object of the present invention is to provide an improved method for the determination of one or more parameters of a seat passenger, which reduces the above-described risk.

In order to overcome the above-mentioned problems, the present invention proposes a method for the determination of a physical property parameter of a seat passenger comprising the steps of:

a) getting a reading of a first parameter from an occupancy sensor;

b) plotting a probability vector, said probability vector showing, for each value of the physical property, the probability to cause said reading of said first parameter;

c) correlating said physical property parameter to the range of values of said probability vector with the highest probabilities.

In contrast to the known methods for determining a physical property of a passenger, the present method does not directly associate a specific physical property to a specific reading of the sensor but correlates the reading to the entire range of physical property values, which might cause a specific sensor reading. It follows that the present method does not only consider a correctly seated passenger but also a passenger having a different physical property but seated in a non optimal position. The risk of misclassification of the occupancy status is accordingly reduced.

It should be noted that the present invention is not limited to the determination of the weight of a passenger, but can also be used to determine the size or the build of a passenger sitting on the seat.

In order to improve the certainty of the determination of the physical property, i.e. the actual classification of the occupancy status, the method is preferably based on the evaluation of several parameters of the occupancy sensor. In this case, the method for the determination of a physical property parameter of a seat passenger comprises the steps of:

a) getting a reading of at least two parameters from an occupancy sensor;

b) plotting a probability vector, said probability vector showing, for each value of the physical property, the probability to cause said readings of said at least two parameters;

c) correlating said physical property parameter to the range of values of said probability vector with the highest probabilities.

The probability vector plotted in step b) shows the combined probabilities of each physical property value to cause the actual readings of the different parameters. In other words, the present method superposes the probability ranges of all the different parameters to obtain a final probability curve. It should be noted that the different parameters which are evaluated by the method can be chosen from the following groups:

anthropometric parameters, such as the distance between the centers of force in two adjacent seat parts (IW) or the gradient of the force between the center of the seat and an outer border (DPVratio);

parameters based on absolute force, e.g. the sum of all measured individual forces (SumTDPV) or the number of activated cells (Activated Cells);

form recognition parameters, such as the form and the size of the occupied surface (Pattern Recognition).

In a preferred embodiment of the method, the step of plotting a probability vector comprises the steps of:

a) initializing the probability vector by setting the probability for the entire range of values of said physical property to a specific value; and b) for each parameter, reducing the probability for each physical property value for which the respective parameter is outside of calibration curves, said calibration curves showing the maximum and minimum parameter values for each physical property value.

As there is a dispersion of the parameter value between different persons having the same physical property and between different positions of one same person, the calibration curves determine the maximum and minimum reading of a specific parameter for each physical property value. Such calibration curves can be obtained by getting the different readings of each specific parameter for different persons having the same physical property and for different positions on the seat. This step may be repeated for at least two different physical property values. After the data are gathered, the calibration curves (maximum or minimum) can be plotted e.g. by interpolation between the maximum parameter values or the minimum parameter values respectively. The two curves obtained constitute an envelope for each given parameter, which corresponds to the total min-max spread for the range of the physical property to be determined. A given parameter value is likely to be caused by a person having e.g. a specific weight, if the parameter lies between the maximum and minimum calibration curve for this weight, i.e. if the parameter is inside the envelope.

If however, the parameter value lies outside the envelope for this specific weight, the probability for this parameter value having been caused by a person of the specific weight is small. This means that the probability in the probability vector of this weight value has to be reduced with respect to those weight values, for which the actual parameter values lies within the envelope. This reduction of the probability can be done either by multiplying the probability (vector value) of the weight or size, where the actual parameter is outside the corresponding envelope by a given border (<1). Alternatively, the probability lowering method could consist in a subtraction. However in this case it must be ensured that the probability doesn't fall below 0% or below the resolution, so that the different probability steps still can be distinguished.

In a very simple embodiment of the invention, the present method feeds the determined range of physical property values with the highest probability to the control circuit of a secondary restraint system. This control system then switches the restraint system in a deployment mode, which is considered to be suitable for the entire determined range of the physical property. In a morte preferred embodiment of the invention, the correlation of said physical property parameter to said range of values with the highest probabilities comprises the steps of a) calculating an average physical property value from the range of values of said probability vector with the highest probability;

b) setting said physical property parameter to be determined to equal said average physical property value.

The output of such a method consists of an average physical property value which will cause the control circuit of the secondary restraint system to switch into a specific deployment modus.

In a method in which a plurality of parameters are considered, the ranges of physical property values adjacent to the range with the highest probability, i.e. the ranges with the second highest probability, may also have a rather high probability to cause the actual readings of the different parameters. This means that the probability of the actual physical property to lie within these ranges is still rather high. In order not to discriminate these probabilities, said step of correlating said physical property parameter to said range of values with the highest probabilities in a more preferred embodiment of the method comprises the steps of a) calculating a first average physical property value from the range of values of said probability vector with the highest probability;

b) calculating a second average physical property value from range of values of said probability vector for which the probability is equal or higher than a second highest probability;

c) setting said physical property parameter to be determined to equal a rounded average of said first and second average physical property value.

It should be noted, that the type of sensor from which the different parameters are obtained is not relevant to the present invention. In fact, the method can be used with any type of seat occupancy sensors, such as pressure sensitive seat sensors and/or a capacitive sensors.

It will further be appreciated, that the present method can be combined with a temperature compensation method, which eliminates the influence of the temperature on the readings of the specific parameters. In fact, because of variations with temperature of the characteristics of the system, the individual readings of the different sensors depend on the ambient temperature in the vehicle. If the method is combined with a suitable temperature compensation, such influence of the temperature on the parameter readings and by that on the determination of the actual physical property can be advantageously reduced.

BRIEF DESCRIPTION OF THE DRAWINGS

The present invention will be more apparent from the following description of a not limiting embodiment with reference to the attached drawings, wherein.

DETAILED DESCRIPTION OF THE INVENTION

Figure 1:
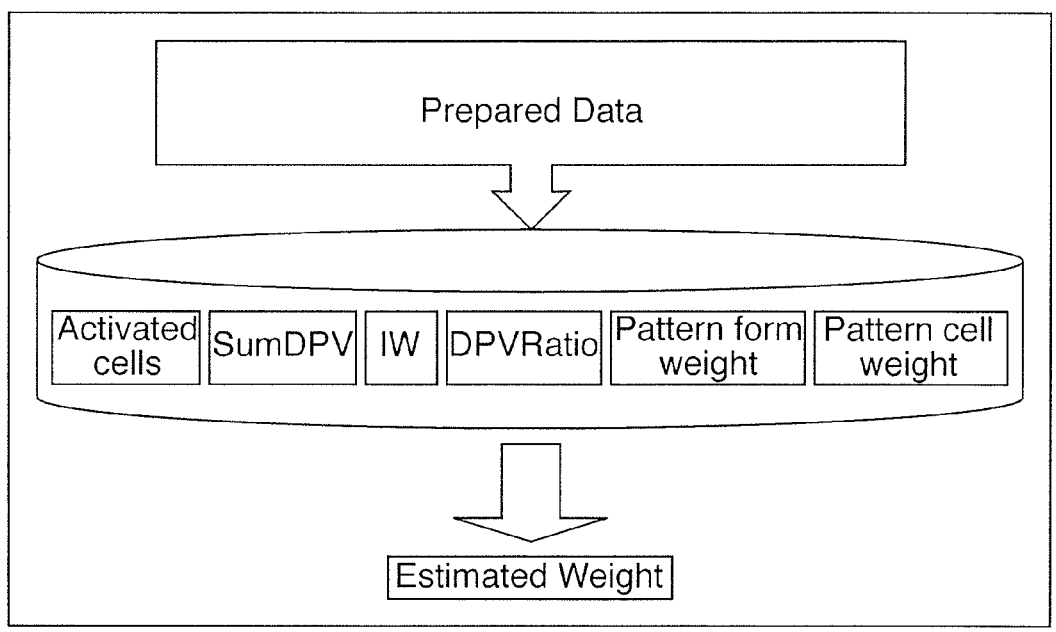
FIG. 1: shows a bloc diagram of a weight estimation module.

FIG. 1 shows a bloc diagram of a weight estimation module employing the method of the present invention. While the shown method is used to determine the weight of the passenger, it will be clear to the one skilled in the art, that an analogous method can be used to determine the size or build of the passenger. The method for determining the weight of a seat passenger may be based one or more of the following types of parameters of a seat occupancy sensor (OC Profiles):

anthropometric parameters, such as the distance between the centers of force in two adjacent seat parts (IW) or the gradient of the force between the center of the seat and an outer border (DPVratio);

parameters based on absolute force, e.g. the sum of all measured individual forces (SumTDPV) or the number of activated cells (Activated Cells);

form recognition parameters, such as the form and the size of the occupied surface (Pattern Recognition).

The aim of the weight estimation module is to combine the values of all parameters to compute a final estimated weight.

Each parameter has an output value that should be correlated to the weight. As there is a dispersion of the parameter value between different persons having the same weight and between different positions of one same person, not a discrete weight value but a high probability weight range can be assigned to one output parameter value. Accordingly a highest-probability weight range is computed for each parameter value using calibration curves (envelopes). The result of all probability calculations is a probability curve from which the final estimated weight (EW) is deducted.

Figure 2:
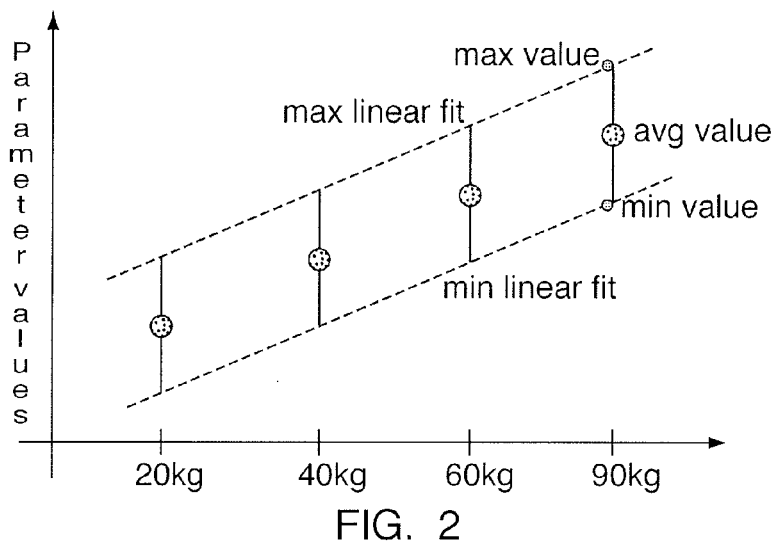
FIG. 2: shows a diagram of the envelopes of one parameter vs. weight (physical property)

This is achieved thanks to the so called 'weight estimation envelopes'. For each parameter, two curves in function of weight are needed: a maximum and a minimum parameter value curve as shown in FIG. 2. The definition of the envelope for a given parameter is the total min-max value spread for the weight range from 0 to 150 kg. This spread is defined by fitting the data collected during sit-in calibration. The seat configuration: nominal foam hardness, the most typical trim type, seat back and cushion inclination set to the manufacturer-defined nominal value.

After the data collection, the min and max parameter values have to be found. This operation will result in definition of the envelopes. All weight-points parameter values (min, max) have to be depicted on the same chart, together with trend lines or interpolation fit, which will define the envelopes.

After these calibration curves have been determined, the weight estimation method can be implemented. When the weight estimation module gets the actual computed parameter values, it superposes the probability ranges of all those parameters to obtain a final probability curve with as many different probability steps as there are parameters. Using the weight ranges with the highest and the second highest probabilities, it calculates the final estimated weight.

The calculation of the probability vector may e.g. comprise the following steps:

1. initialize a probability vector whose index is the weight e.g. in 1 kg steps (example: one probability value for each 1 kg weight range between 1 and 150 kg) to a 100% value Ex:

| Weight (index) | 1 kg | 2 kg | 3 kg | ... | 150 kg |
|---|---|---|---|---|---|
| Probability | 100% | 100% | 100% | 100% | 100% |

2. For each parameter, multiply the probability (vector value) of the weight where the actual parameter value is outside the corresponding envelope (>max or <min) by a given border.

Ex:

| Weight (index) | 1 kg | 2 kg | 3 kg | ... | 150 kg |
|---|---|---|---|---|---|
| Probability | 56.25% | 75% | 75% | ... % | 56.25% |

3. Find and store the highest and second highest probability value in the vector.
4. Calculate the average of the weight points (index of vector) where the probability is equal to the highest probability.
5. Calculate the average of the weight points (index of vector) where the probability is equal or higher than the second highest probability.
6. The final estimated weight is the rounded average of the two last averages.

Figure 4:
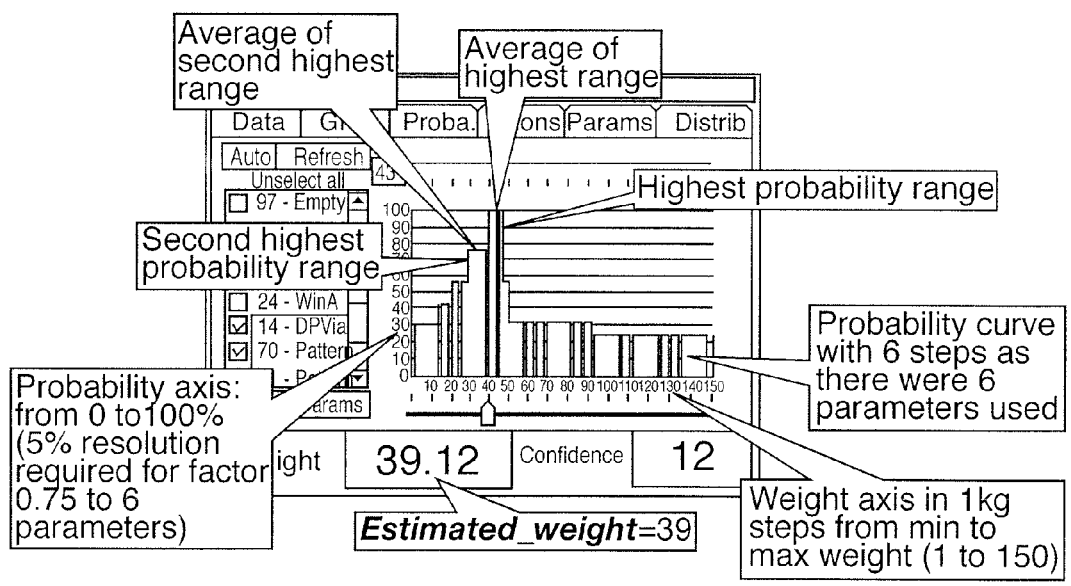
FIG. 4: shows a probability vector including several parameters.
Figure 3:
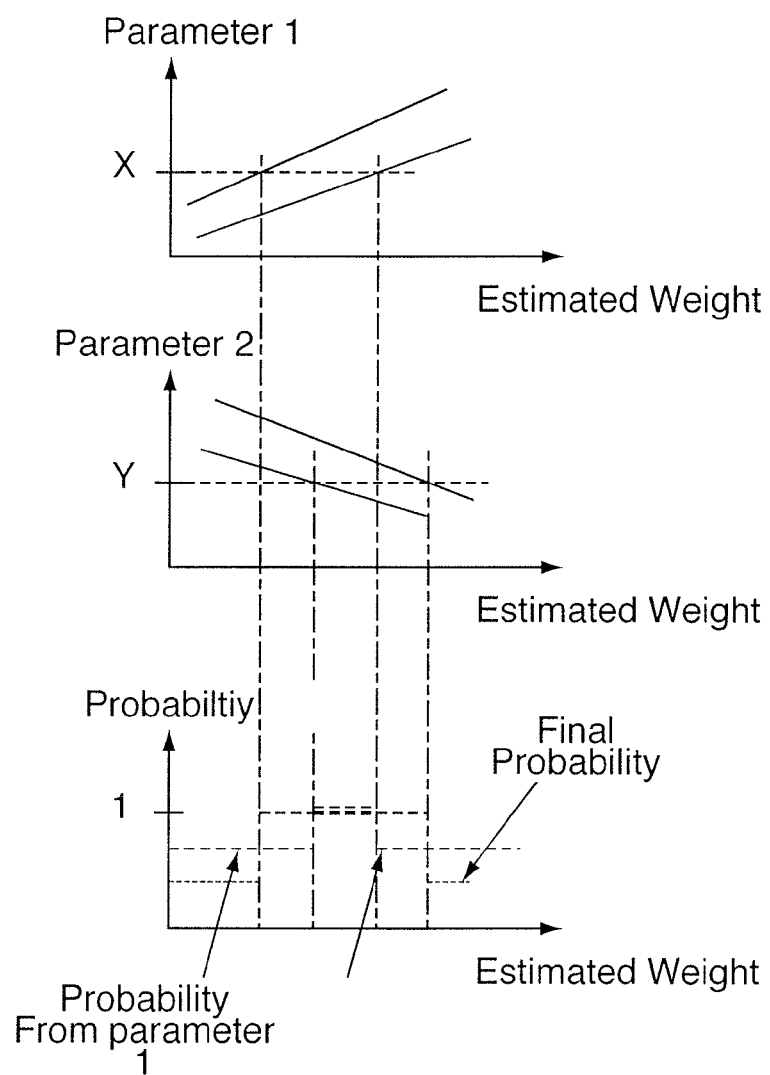
FIG. 3: illustrates the principle of the probability vector.

FIG. 4 shows as an example a probability vector calculated on the basis of six different parameters. The probability lowering method used to exclude low probability ranges could be varied as it doesn't affect the final result. The 'multiply by a given border' could be replaced by a subtraction, for example, but it must be ensured that the probability doesn't fall below 0% or below the resolution, so that the different probability steps still can be distinguished.

In order to eliminate the influence of the ambient temperature in the vehicle on the parameter readings from the sensor, a temperature compensation may further be implemented. The aim of the temperature-weight compensation module is to correct the estimated weight in function of the temperature. Such a correction should depend on the actual estimated weight and the temperature.

The invention claimed is:

1. A method for the determination of a weight parameter of a seat passenger, comprising the steps of:
    a) getting a reading of at least two parameters from an occupancy sensor;
    b) plotting a probability vector, said probability vector showing, for a plurality of weight ranges, the probability for a seat passenger belonging to a weight range to cause said readings of said at least two parameters;
    c) correlating said weight parameter to a range of values of said probability vector with the highest probabilities.

2. The method according to claim 1, wherein said step of plotting a probability vector comprises the steps of:
    a) initializing the probability vector by setting the probability for each weight range to a specific value; and
    b) for each parameter, reducing the probability for each weight value for which the respective parameter is outside of calibration curves, said calibration curves showing the maximum and minimum parameter values for each weight value.

3. The method according to claim 2, wherein said step of correlating said weight parameter to said range of values with the highest probabilities comprises the steps of
    a) calculating an average weight value from the range of values of said probability vector with the highest probability;

b) setting said weight parameter to be determined to equal said average weight value.

4. The method according to claim 2, wherein said step of correlating said weight parameter to said range of values with the highest probabilities comprises the steps of
   a) calculating a first average weight value from the range of values of said probability vector with the highest probability;
   b) calculating a second average weight value from the range of values of said probability vector for which the probability is equal or higher than a second highest probability;
   c) setting said weight parameter to be determined to equal a rounded average of said first and second average weight value.

5. The method according to claim 2, wherein said occupancy sensor is a pressure sensitive seat sensor and/or a capacitive sensor.

6. The method according to claim 1, wherein said step of correlating said weight parameter to said range of values with the highest probabilities comprises the steps of
   a) calculating an average weight value from the range of values of said probability vector with the highest probability;
   b) setting said weight parameter to be determined to equal said average weight value.

7. The method according to claim 1, wherein said step of correlating said weight parameter to said range of values with the highest probabilities comprises the steps of
   a) calculating a first average weight value from the range of values of said probability vector with the highest probability;
   b) calculating a second average weight value from the range of values of said probability vector for which the probability is equal or higher than a second highest probability;
   c) setting said weight parameter to be determined to equal a rounded average of said first and second average weight value.

8. The method according to claim 1, wherein said occupancy sensor is a pressure sensitive seat sensor or a capacitive sensor.

9. A method for the determination of a weight parameter of a seat passenger, comprising the steps of:
   a) getting a reading of at least two parameters from an occupancy sensor;
   b) providing weight ranges and plotting a probability vector, said probability vector showing, for each weight range, the probability for a seat passenger belonging to said weight range to cause said readings of said at least two parameters;
   c) correlating said weight parameter to a range of values of said probability vector with the highest probabilities.

10. The method according to claim 9, wherein said step of plotting a probability vector comprises the steps of:
   a) initializing the probability vector by setting the probability for the entire weight range to a specific value; and
   b) for each parameter, reducing the probability for each weight value for which the respective parameter is outside of calibration curves, said calibration curves showing the maximum and minimum parameter values for each weight value.

11. The method according to claim 9, wherein said step of correlating said weight parameter to said range of values with the highest probabilities comprises the steps of:
   a) calculating an average weight value from the range of values of said probability vector with the highest probability;
   b) setting said weight parameter to be determined to equal said average weight value.

12. The method according to claim 9, wherein said step of correlating said weight parameter to said range of values with the highest probabilities comprises the steps of:
   a) calculating a first average weight value from the range of values of said probability vector with the highest probability;
   b) calculating a second average weight value from the range of values of said probability vector for which the probability is equal or higher than a second highest probability;
   c) setting said weight parameter to be determined to equal a rounded average of said first and second average weight value.

13. The method according to claim 9, wherein said occupancy sensor is a pressure sensitive seat sensor or a capacitive sensor.

14. A method for controlling the deployment of a restraint system, comprising the steps of:
   a) determining a weight parameter of a seat passenger by
      i) getting a reading of at least two parameters from an occupancy sensor;
      ii) providing weight ranges and plotting a probability vector, said probability vector showing, for each weight range, the probability for a seat passenger belonging to said weight range to cause said readings of said at least two parameters,
      iii) correlating said weight parameter to a range of values of said probability vector with the highest probabilities; and
   b) switching the restraint system in a deployment mode which is adapted to a passenger with said weight parameter.

15. The method according to claim 14, wherein said step of correlating said weight parameter to said range of values with the highest probabilities comprises the steps of
   a) calculating an average weight value from the range of values of said probability vector with the highest probability;
   b) setting said weight parameter to be determined to equal said average weight value.

16. The method according to claim 14, wherein the said step of correlating said weight parameter to said range of values with the highest probabilities comprises the steps of
   a) calculating a first average weight value from the range of values of said probability vector with the highest probability;
   b) calculating a second average weight value from the range of values of said probability vector for which the probability is equal or higher than a second highest probability;
   c) setting said weight parameter to be determined to equal a rounded average of said first and second average weight value.

17. The method according to claim 14, wherein said occupancy sensor is a pressure sensitive seat sensor and/or a capacitive sensor.

18. A method for controlling the deployment of a secondary restraint system, comprising the steps of:

a) determining a weight parameter of a seat passenger by
   i) getting a reading of at least two parameters from an occupancy sensor;
   ii) plotting a probability vector, said probability vector showing, for a plurality of weight ranges, the probability for a seat passenger belonging to a weight range to cause said readings of said at least two parameters;
   iii) correlating said weight parameter to a range of values of said probability vector with the highest probabilities; and
b) switching the secondary restraint system in a deployment mode which is adapted to a passenger with said weight parameter.

* * * * *